March 19, 1963 R. L. GARWIN 3,082,408

PERSISTENT CURRENT STORAGE DEVICE

Filed Aug. 6, 1958 2 Sheets-Sheet 1

INVENTOR.
RICHARD L. GARWIN

BY John E. Dougherty Jr.

ATTORNEY

March 19, 1963 R. L. GARWIN 3,082,408

PERSISTENT CURRENT STORAGE DEVICE

Filed Aug. 6, 1958 2 Sheets-Sheet 2

United States Patent Office 3,082,408

Patented Mar. 19, 1963

3,082,408
PERSISTENT CURRENT STORAGE DEVICE

Richard L. Garwin, Scarsdale, N.Y., assignor to International Business Machines Corporation, New York, N.Y., a corporation of New York Filed Aug. 6, 1958, Ser. No. 753,564
12 Claims. (Cl. 340—173.1)

The present invention relates to superconductive computer devices and, more particularly, to storage devices of the type wherein persistent currents are stored in a closed loop of superconductive material.

A great deal of research and engineering effort has recently been expended in an effort to develop superconductor devices and circuits of the type usable in computer applications. Some of the circuits developed, including a flip flop circuit which may be used as a storage cell, are described in an article entitled "The Cryotron—A Superconductive Computer Component" which appeared in the April 1956 issue of the Proceedings of the IRE, vol. 44, pages 482–493. Further superconductor circuit devices, particularly memory devices employing superconductive loops in which persistent currents are stored, are described in two articles enttiled "Trapped-Flux Superconducting Memory" and "An Analysis of the Operation of a Persistent-Supercurrent Memory Cell," by J. W. Crowe and R. L. Garwin, respectively, which appeared in the IBM Journal of Research and Development, volume 1, No. 4, October 1957. The latter two articles describe and analyze memory cells of the type wherein an externally applied magnetic field is employed either to induce a persistent current in a superconductive loop or cause a portion of such a loop to be driven resistive so that, when a current applied to the loop is terminated, a persistent current is stored in the loop. In accordance with the principles of the present invention, a persistent current memory device is provided wherein the entire operation, that is, the storage of a persistent current in either direction in the loop and the quenching or destroying of the stored persistent current, is controlled by pulses applied directly to a terminal in the loop. In one of the embodiments of the invention disclosed herein by way of illustration, a superconductive loop is provided which comprises two superconductive paths of equal inductance connected between a current input terminal and a current output terminal. One of the paths includes a portion which exhibits a lower Silsbee current at the operating temperature of the circuit than the remaining portions of the loop. By Silsbee current is meant the current which, when flowing in the particular conductor, is capable of driving the conductor from a superconductive to a resistive state. Information is stored in the device by applying a pulse of predetermined magnitude and polarity. This pulse is effective as it is applied to cause the portion of the loop having the low Silsbee current to become resistive so that, upon termination of the pulse, a persistent current is stored in the loop. This state, with a persistent current stored in the loop, may be considered as one of two possible binary information-representing states. The other state is achieved by applying a pulse of opposite polarity and in magnitude equal to one-half the magntiude of the applied storage pulse. This pulse is effective, upon its termination, to reduce the persistent current in the loop to essentially zero. The persistent current state of the loop is interrogated nondestructively using a superconductive component which is arranged adjacent the loop and is subject to magnetic fields produced by persistent currents in the loop.

A further embodiment of the invention, which is described herein, demonstrates a device which is capable of attaining three distinguishably different states. In the first state, a persistent current in one direction is stored in a superconductive loop; in the second state, a persistent current in the opposite direction is stored; and in the third state, there is no persistent current stored in the loop. All three of these states are achieved by applying pulses of predetermined magnitude and polarity to a terminal in the loop.

Further embodiments of storage loops usable in superconductive storage cells constructed in accordance with the principles of the invention are also disclosed. In one such embodiment, which may be fabricated entirely with the same superconductive wire stock, each of the paths of the superconductive loop includes a coil, one of which is loosely wound and the other of which is tightly wound. The latter coil generates a more intense magnetic field and, therefore, may be said to have a lower Silsbee current than the remaining portions of the loop since a much smaller current is capable of causing it to be driven resistive by its self magnetic field.

In accordance with another embodiment, a superconductor loop is provided which may be fabricated either with wire or using thin film techniques. In this embodiment, the same superconductive material may be used throughout and the difference in the Silsbee current characteristics of the two paths is achieved by constructing one path with at least a portion which has a smaller cross sectional perimeter than that of the remaining portions of the loop.

Theerfore, it is an object of the present invention to provide new and improved superconductive persistent-current storage devices.

A further object is to provide a persistent current storage loop which consists of two paths extending in parallel between two terminals wherein each of the paths has the same inductance and one of the paths includes a section which exhibits a lower Silsbee current than the remaining portions of the loop.

Still another object is to provide a persistent current storage device wherein currents are stored in the loop representative of information values and the stored currents are quenched or destroyed under the control of current pulses applied directly at a terminal in the loop.

Still another object is to provide a persistent current storage device of the above described type which may be interrogated nondestructively.

A further object is to provide persistent current storage devices of the above described types utilizing a superconductive loop which may be fabricated entirely of one superconductive material.

Other objects of the invention will be pointed out in the following description and claims and illustrated in the accompanying drawings, which disclose, by way of example, the principle of the invention and the best mode which has been contemplated of applying the principle.

In the drawings:

FIG. 1 is a diagrammatic representation of a persistent current storage circuit constructed in accordance with the principles of the invention.

FIGS. 1A, 1B, and 1C are pulse diagrams indicating current conditions in different portions of the circuit of FIG. 1 for various operating procedures.

Figure 1:
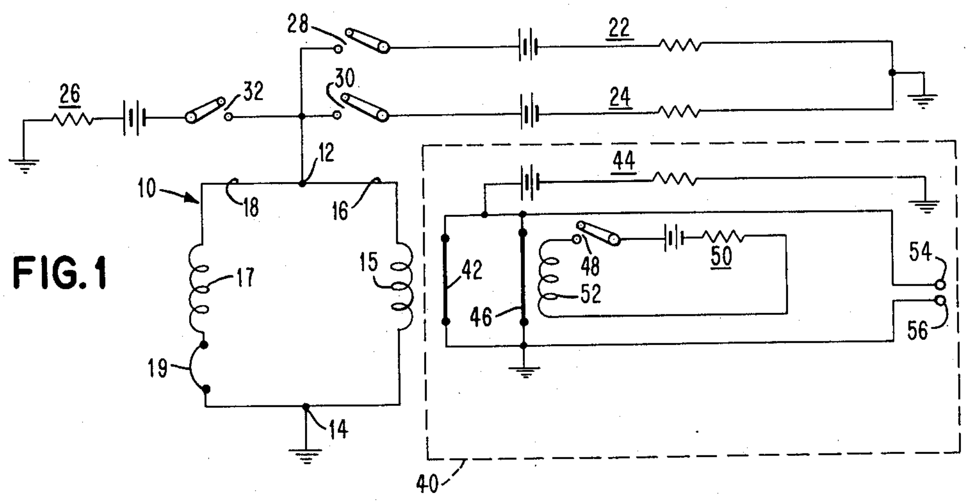
Figure 4:
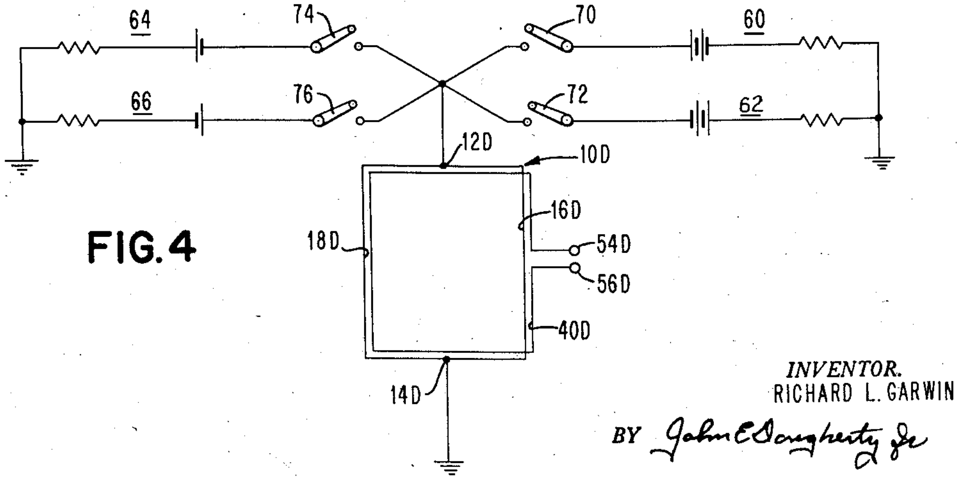
FIG. 4 is a schematic representation of another storage circuit constructed in accordance with the principles of the invention.
Figures 1A, 1B, 1C, 4A, 4B, 4C:
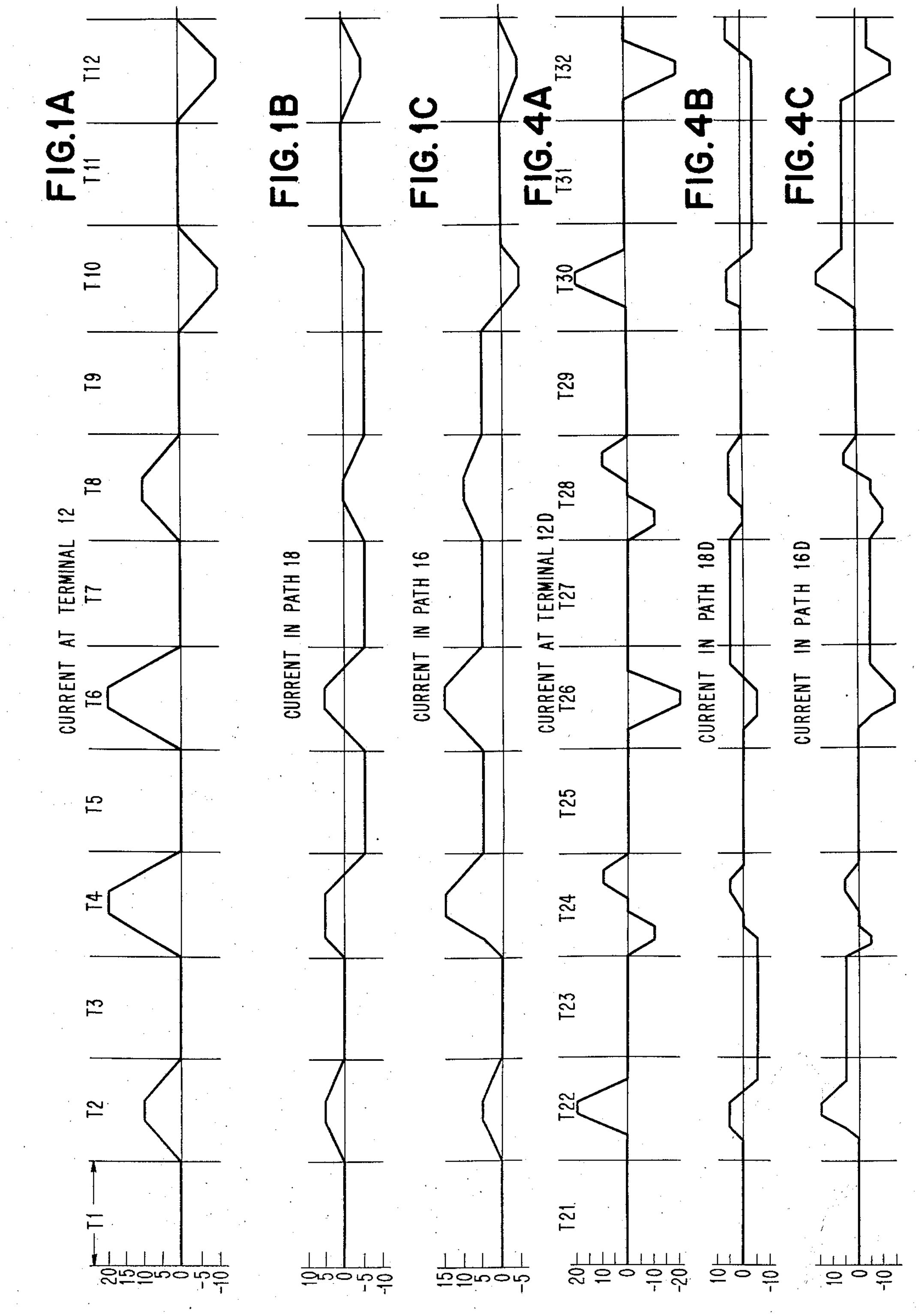

FIGS. 4A, 4B, and 4C are pulse diagrams which represent current conditions in different portions of the circuit of FIG. 4 for different operating procedures.

Referring now to the details of the drawings and, in particular, to FIG. 1, the numeral 10 designates a persistent current storage loop. This loop contains two terminals 12 and 14. Terminal 14 is connected either directly to ground, as shown, or may be connected to further circuitry, which is preferably superconductive, to ground. The inputs which are in the form of current pulses are applied to terminal 12. Loop 10 may, with respect to these inputs, be considered to consist of two parallel current paths extending between the terminals 12 and 14, and the construction is such that each of these paths has the same inductance. One of these paths, which is designated 16, includes a coil 15 and the other path, designated 18, includes a coil 17. Both of the paths are fabricated entirely of superconductive material and, when the circuit is in operation, are maintained at a temperature in the vicinity of absolute zero by cooling apparatus, not shown, so that both paths are, in the absence of a magnetic field, entirely superconductive. If, for example, the operating temperature is 4.2° Kelvin, which is a convenient temperature since it is the temperature at which liquid helium boils at atmospheric pressure, the entire loop, with the exception of a conductor 19 in path 18, may be fabricated of niobium. This material has a superconductive transition temperature of about 8° K. and, at an operating temperature of 4.2° K., remains superconductive in the presence of magnetic fields in excess of 1000 oersteds. The conductor section 19 may be fabricated of tantalum which undergoes transitions between superconductive and normal states in the absence of a magnetic field at a temperature of about 4.4° K. When maintained at a temperature of 4.2° K., tantalum may be driven resistive by applied magnetic fields of about 100 oersteds or less, according to the characteristics of the particular tantalum sample. The superconductivity of the tantalum conductor may also be destroyed by causing a sufficient current to pass through the conductor. This current is generally termed the Silsbee current. The actual Silsbee current for a tantalum conductor varies both with the number and type of impurities present and the geometry of the particular conductor. For tantalum wires having the same impurity characteristics, the Silsbee current decreases as the circumference of the wire is decreased. Thus, a tantalum wire having a diameter of 10 mils will have a Silsbee current in the neighborhood of 4.5 amperes, whereas a tantalum wire having a diameter of 1 mil will have a Silsbee current of about .45 ampere. For the illustrative purposes of this disclosure, the operating temperature of the circuits described is considered to be 4.2° K.; the conductor 19 is a tantalum conductor having a Silsbee current which, for ease of explanation, is considered to be just above five units of current; and the remaining portions of the loop 10 are niobium and remain in a superconductive state during all of the operations described.

The operation of the circuit of FIG. 1 will now be described with reference to the current wave forms of FIGS. 1A, 1B, and 1C which show, respectively, the current applied at terminal 12, the current condition of path 18, and the current condition of path 16. Input pulses are applied to the circuit at terminal 12 by three current sources 22, 24, and 26, each of which is illustratively represented by a battery and a resistor, under the control of three switching devices illustratively represented by switches 28, 30, and 32, respectively. Initially, as shown, during the time interval T1, there is no current in either of the paths 16 or 18 and no current applied at terminal 12. During the next time interval T2, switch 28 is operated to allow current source 22 to apply at terminal 12 a current pulse having the wave, form shown in FIG. 1A. This pulse has a maximum magnitude of ten units of current. As the pulse is applied, the current at terminal 12 divides equally between paths 16 and 18 since both paths are entirely superconductive and each has the same inductance. The current in each path rises to a maximum of five current units and, since the Silsbee current for the tantalum conductor 19 is not exceeded, both paths remain superconductive and the current distribution remains the same until the applied pulse is terminated. At this time, the currents in the paths decay along with the applied pulse and, since the paths have equal inductance, the decay is the same in each path and, at the end of time interval T2 and during the following time interval T3 when no current pulse is applied at terminal 12, there is no current in either of the paths 16 or 18. The operation is the same when the switch 30 is operated to allow current source 24 to apply a similar pulse having a magnitude of ten current units at terminal 12.

During the time interval T4, switches 28 and 30 are closed simultaneously thereby applying a current pulse which rises to a magnitude of twenty units at terminal 12. Initially, the current divides equally between paths 16 and 18. However, when the current in path 18 attempts to increase above five units, tantalum section 19 becomes resistive. As a result, the current buildup in this path is choked at five units and the remaining portion of the current pulse supplied at terminal 12 is directed into the other path so that, as shown in FIGS. 1A, 1B, and 1C, there is a current of fifteen units in path 16 and a current of five units in path 18.

For the waveforms shown, the construction is such that the resistance introduced in path 18 when section 19 becomes resistive automatically develops an IR voltage, with five units of current in this path, sufficient to cause the remainder of the current applied at terminal 12 to be directed into path 16. When the current pulse is initially applied during time interval T4, the voltage developed in each path is equal to the product of the inductance of the path and the time rate of the current change therein. However, when the tantalum conductor 19 is driven resistive, the rate of current change in path 16 increases and produces an inductive voltage which is equal to the IR voltage across the then resistive conductor 19 in path 18. It should be noted that a similar unequal distribution of current between paths 16 and 18 may be achieved by introducing a resistance in path 18 which is either larger or smaller than that necessary to produce a voltage which is equal to the inductive voltage developed in the other path as the applied current pulse rises from ten to twenty units of current. In such cases, though the same final result may be achieved by properly choosing electrical and thermal time constants for the circuit, there may be some oscillating of the current back and forth between the paths as the applied pulse rises from ten to twenty units and the wave forms of FIGS. 1B and 1C would not be truly indicative of the transient current conditions in the paths 16 and 18.

It should be further noted that even when the design is such that the IR voltage across path 18 is sufficient to balance the inductive voltage across path 16 as the entire current applied at terminal 12 is directed to the latter path, there may be some slight oscillations between the paths and, actually, after the input pulse reaches its maximum magnitude and is held constant thereat, there is a shift of enough current from path 18 to 16 to allow conductor 19 to again assume a superconductive state. However, the current distribution, which is achieved after the input pulse has reached its maximum value of twenty units, is essentially as depicted in FIGS. 1A, 1B, and 1C, with the current in path 18 being just below the threshold or Silsbee current for the tantalum conductor 18 and, therefore, five current units and the remaining current of fifteen units being in the other path 16. This condition persists until the input at terminal 12 is terminated by opening switches 28 and 30. At this time, the entire loop 10 is superconductive and, with the current in the paths 16 and 18 distributed in a ratio which is not in proportion to the inductances of these paths, there is a net flux threading the loop 10. Since it is a characteristic of the superconductive phenomenon that the net flux threading a completely superconductive loop cannot be changed as long as the loop remains completely superconductive, a persstent current is stored in the loop as the input current is terminated. This is illustrated in FIGS. 1A, 1B, and 1C, wherein it is shown that, as the input at terminal 12 is terminated, the currents in paths 16 and 18, which have equal inductance, decay at the same rate. Therefore, as the input current pulse decays from twenty units back to zero, there is a ten unit change in each path and a persistent current of five units is stored in loop 10. Since this current is just below the threshold of Silsbee current for conductor 19, no resistance is introduced in the loop 10 as the input is terminated and the net flux which threads the loop is essentially equal to that which threaded the loop when the applied current was distributed with fifteen units in path 16 and five units in path 18. Thus, it can be seen that, by operating both of the switches 28 and 30 simultaneously, a persistent current of five units can be stored in loop 10, whereas, when either of the switches is operated by itself, no current is stored in the loop. The persistent current stored during time interval T4 will persist indefinitely unless quenched by introducing resistances in the loop. The presence of the persistent current is indicative of the prior coincident application of inputs by the current sources 22 and 24.

An interesting and somewhat important characteristic of the circuit of FIG. 1 is that the pulses applied by sources 22 and 24 need not be exactly simultaneous. It is only necessary that the pulses are so applied that a level of twenty units of applied current at terminal 12 is attained. Thus, for example, switch 28 may be closed first and switch 30 closed later, and, thereafter, after the applied current at terminal 12 reaches a value of twenty units and the described distribution of current with fifteen units in path 16 and five units in path 18 is achieved, the input pulses may be terminated either simultaneously or successively with the same result, that is, a current of five units being stored in the loop 10.

From the polarities of the batteries used to represent sources 22 and 24, it is apparent that the applied current is in a downward direction in both paths 16 and 18. This direction of current in each path is plotted as the plus direction in the wave forms of FIGS. 1B and 1C. When the inputs are terminated, the persistent current stored in loop 10 is in a clockwise direction with the current in path 16 being in the down direction and, thus, represented as positive in FIG. 1C, and the current in path 18 being in the up direction and, therefore, being represented as negative in FIG. 1B.

The current stored in the loop 10 persists for the time interval T5 during which no inputs are applied at terminal 12. During the next time interval T6, switches 28 and 30 are again operated simultaneously. However, due to the fact that there is initially stored in the loop a persistent current, which is in the up direction in path 18 and in the down direction in path 16, the applied current may divide equally without causing the tantalum conductor 19 to become resistive. Therefore, there is no change in the net flux threading loop 10 as the input pulse is applied and, when the input reaches its maximum value of twenty units, the current in paths 16 and 18 is again distributed in a ratio which is not in proportion to the inductances of these paths, that is, there is a current of fifteen units in path 16 and a current of five units in path 18. When the inputs are terminated, the current decays in the same manner as before so that a clockwise persistent current of five units remains stored in loop 10. It is thus apparent that, when an input pulse of twenty units of current is applied at terminal 12, a clockwise persistent current of five units remains in the loop at the termination of the input, regardless of whether or not there was initially a persistent current stored in the loop.

The stored current persists during a time interval T7 and the persistent current condition of the loop is not altered by the application during the time interval T8 of a half select input at terminal 12. This input applied by operating one or the other, but not both, of the switches 28 or 30 merely divides equally between the paths 16 and 18 without causing conductor 19 to become resistive. When the input is terminated, the loop reverts to its initial persistent current condition, that is, storing a persistent current of five units in a clockwise direction. This persistent current may, however, be quenched by applying a current pulse of opposite polarity and having a maximum magnitude of ten units. This is accomplished by operating actuating switch 32 to produce the operation depicted during time interval T10. When the negative half select pulse is applied, it tends to increase the current in path 18 and decrease the current in path 16. However, due to the presence of the tantalum conductor 19 in path 18, which becomes resistive when the current in that path exceeds five units, this current pulse is directed entirely into path 16. Since the conductor 19 is resistive during this operation, the net flux threading the loop may be changed and, thus, when the applied negative half select pulse, which serves as a reset pulse, reaches its maximum value of ten units, there is an equal current of minus five units in each of the paths 16 and 18. When this reset pulse is terminated, the current decays at the same rate in both paths since they are of equal inductance so that, at the end of time interval T10, there is no persistent current stored in loop 10.

The operation depicted during the time interval T12 illustrates that when a negative half select pulse or reset pulse is applied at terminal 20 by operating switch 32 at a time when no current is stored in the loop, the loop will return to the same condition with no current stored upon termination of the reset pulse.

The persistent current state of loop 10 is detected by a sense circuit shown to be included within a dotted block 40 in the schematic diagram of FIG. 1. This circuit includes a superconductor element 42 which is shown adjacent to coil 15 in path 16 of loop 10 but which is preferably arranged within the coil. This element 42 is fabricated of a superconductive material such as tantalum so that, while it is normally superconductive at the operating temperature, it is driven into a resistive state by the magnetic field of coil 15 when there is a persistent current of five units stored in loop 10. In order to ensure proper operation without severe circuit parameters, it is preferable to design the sensing element 42 so that it is driven resistive when the current in coil 15 exceeds a value less than five units, for example, three units of current.

Conductor 42 receives current from the source 44, and connected in parallel with conductor 42 across this source is a second superconductor element 46. The latter conductor is normally superconductive but may be driven resistive by operating switch 48, thereby allowing a source 50 to supply current to a coil 52 which is shown adjacent to conductor 46 but which is preferably wound around this conductor. A pair of output terminals 54 and 56 are connected across the parallel conductors 42 and 46 and, when either or both of these conductors are in a superconductive state, there is no voltage developed between these output terminals. When, however, both of the conductors are resistive, which condition exists only when there is a sufficient current in loop 10 at a time when switch 48 is operated, the current from source 44 produces a voltage drop across the parallel connected conductors and this voltage is manifested between terminals 54 and 56. Thus, the condition of loop 10 can be interrogated at any time, for example, during any one of the odd numbered time intervals of FIGS. 1A, 1B, and 1C, merely by operating switch 48 to cause conductor 46 to be driven resistive. When there is a persistent current in loop 10, as during time intervals T5, T7, and T9, an output voltage is continuously manifested between the terminals 54 and 56 when switch 48 is closed. When however, conductor 42 is superconductive, as during the other odd numbered time intervals, except for a possible transient inductive voltage, there is no voltage developed between terminals 54 and 56 when switch 48 is operated, since the entire current from source 44 is directed through the then superconductive conductor 42.

Figure 2:
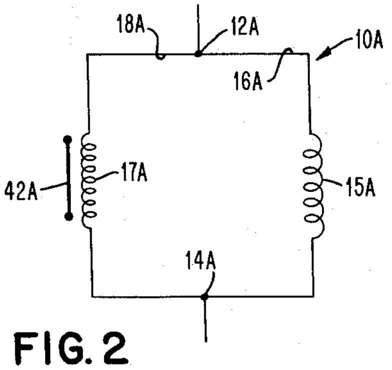
FIGS. 2 and 3 are schematic representations of further embodiments of superconductive loops usable in storage devices constructed in accordance with the principles of the invention.

Another embodiment of a superconductor loop usable in the circuit of FIG. 1 is shown in the schematic diagram of FIG. 2. In this figure, designations corresponding to those considered in FIG. 1 with the letter A appended are employed to represent the various elements of the circuit. The loop of FIG. 2 is generally designated 10A and includes two paths 16A and 18A extending between a current input terminal 12A and a ground terminal 14A. Paths 16A and 18A include coils 15A and 17A, respectively, and the loop differs from that of FIG. 1 in that it is fabricated entirely of the same superconductive material, which, in this illustrative embodiment, is tantalum. Coils 15A and 17A have equal inductance, as do the paths 16A and 18A in which they are connected. However, coil 17A is a shorter coil which is tightly wound with a large number of turns per unit length, whereas coil 15A is loosely wound to have a fewer number of turns per unit length. As a result of this arrangement, a unit of current in coil 17A produces a more intense magnetic field than a unit of current in coil 15A and, therefore, coil 17A is driven resistive by a smaller self current than coil 15A. The design is functionally the same as that of loop 10 of FIG. 1 in that coil 17A is driven resistive by its own magnetic field when the current through the coil exceeds five units. However, the geometry and characteristics of the tantalum wire which forms the remaining portion of path 18A and the entire path 16A, including the loosely wound coil 15A, is such that these portions of the loop are capable of carrying a current in excess of fifteen units without being driven resistive by their self magnetic fields. Thus, the entire loop 10A of FIG. 2 may be fabricated of the same wire stock and, when used in the circuit of FIG. 1, is operable in the same manner as the loop 10 shown in that figure.

The output sense conductor may be arranged within either of the coils 17A or 15A but, as shown in FIG. 2, a sense conductor 42A is preferably arranged within the tightly wound coil 17A which produces a more intense magnetic field when a persistent current is stored in the loop. The condition of conductor 42A, superconductive or normal, indicates whether or not a persistent current is stored in the loop 10A, and this conductor may be connected in a sense circuit in the same way as conductor 42 is connected in FIG. 1.

Figure 3:
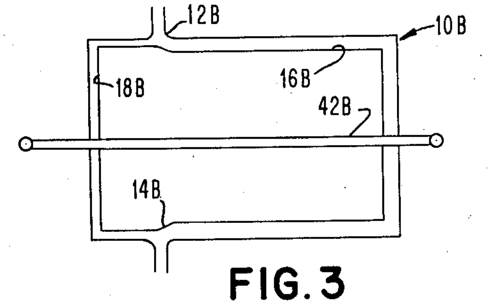

Still another embodiment of a storage loop constructed in accordance with the principles of the invention is shown in FIG. 3. This loop is generally designated loop 10B and includes two paths 16B and 18B which extend between an input junction or terminal 12B and a ground function or terminal 14B. The circumference of the wire used in the path 18B is smaller than that used in path 16B. For this reason, the self-field generated by a unit of current in path 18B is greater than the self field produced by a unit of current in path 16B. The geometry of the wire conductors used in the paths is such that when the current in path 18B is in excess of five units, the conductor which forms this path is driven resistive, whereas the larger conductor which forms path 16B is capable of carrying a current in excess of fifteen units and remaining in a superconductive state. Since the inductance of the wire conductors increase as the circumference decreases and increases with length of the conductors, the path 18B is made shorter than the path 16B so that the two paths have the same inductance. The persistent current condition of the paths is sensed using a conductor 42B which is arranged geometrically so that when there is current in this conductor the net flux thereby produced which links loop 10B is essentially zero. There is, therefore, no effective inductive coupling between the conductor and the loop 10B, as is the case with the coil and sense conductor arrangements for the loops of FIGS. 1 and 2. Conductor 42B is normally superconductive but includes a portion arranged adjacent to path 16B and another portion arranged adjacent to path 18B, and the design is such that these portions of the sense conductor are driven resistive when there is a persistent current stored in loop 10B. The condition of this sense conductor, superconductive or normal, indicates whether or not there is a persistent current stored in loop 10B, and conductor 42B may be connected in a sense circuit in the same manner as the conductor 42 is shown to be connected in the circuit of FIG. 1.

The circuit of FIG. 3 may also be constructed using thin film conductors instead of wire conductors, since it is the cross sectional perimeter of the conductors which is determinative of the current which they can carry without being driven resistive by their own self field. The loop may, for example, be constructed using films of the same thickness but with the conductor film which forms path 18B being narrower than that which forms path 16B. As is the case when wire wound conductors are employed, the narrower path exhibits more inductance per unit length and, therefore, path 16B is made longer than path 18B so that both paths exhibit the same inductance and the circuit may be operated in the same manner as the storage loop 10 of FIG. 1.

A further embodiment of the invention is shown in FIG. 4. In this figure, the superconductive storage loop utilized, is generally represented by the designation 10D. This loop may be of any of the types shown in FIGS. 1, 2, and 3 above and includes two parallel paths 18D and 16D extending between a current input terminal 12D and a ground terminal 14D. Current inputs are applied to this circuit by four current sources 60, 62, 64, and 66 under the control of switches 70, 72, 74, and 76, respectively. Each of the current sources 60 and 62 is effective, when the associated switch is closed, to apply at terminal 12D a current pulse having a maximum magnitude of twenty current units. The pulses supplied by source 60 are positive and those supplied by source 62 are negative. Each of the sources 64 and 66 is effective, when the associated switch is operated, to apply at terminal 12D a current pulse having a maximum magnitude of ten current units. The pulses supplied by source 64 are negative and those supplied by source 66 are positive. Sources 60 and 62 which supply pulses under control of switches 70 and 72, respectively, are employed to cause persistent currents to be stored in loop 10D, with pulses supplied by source 60 being arbitrarily designated as binary one input storage pulses and those supplied by source 62 being designated binary zero input storage pulses. Sources 64 and 66 are operated to interrogate the state of loop 10D and also to restore this loop to a condition in which there is no persistent current in the loop.

The operation of the circuit will now be described with reference to the waveforms shown in FIGS. 4A, 4B, and 4C, which represent, respectively, the current applied at terminal 12D, the current in path 18D, and the current in path 16D. As in FIG. 1, positive currents in FIGS. 4A, 4B, and 4C represent current in a down direction in FIG. 4, and negative currents represent currents in an up direction. During the first time interval shown in FIGS. 4A, 4B, and 4C (which is designated T21), there is no current applied at terminal 12D and no current stored in loop 10D. During time interval T22, switch 70 is operated to allow source 60 to apply a twenty unit current pulse at terminal 12D. The operation is similar to that described above with reference to FIGS. 1A, 1B, and 1C, resulting in the establishing of a persistent current of five units in a clockwise direction in loop 10D. This current persists during the time interval T23 and is quenched during the following time interval T24 when the storage device, which is here loop 10D, is interrogated and reset by successively operating switches 74 and 76. As a result of this successive operation of these switches, negative and positive current pulses of ten units are successively applied at terminal 120 during the time interval T24. The first applied pulse, the negative pulse, is effective to quench the persistent current stored in loop 10D. The second applied puls,e the positive pulse of ten units, is ineffective to change the condition of the loop so that, at the end of time interval T24, the loop is back in its original condition without any stored persistent current.

The outputs for the storage loop 10D are detected by a sense loop which is designated 40D in FIG. 4 and which is actually arranged immediately above or below loop 10D but which, for purposes of illustration, is shown in a juxtaposed position. This loop terminates in a pair of terminals 54D and 56D at which output voltages are manifested during interrogation which are indicative of the persistent current condition of the loop. Referring again to the waveforms of FIGS. 4A, 4B, and 4C, it can be seen that when, during the first portion of time interval T24, switch 74 is closed to allow source 64 to apply a negative pulse of ten current units at terminal 12, this current pulse tends to increase the current in path 18D above the limiting value of five units so that this path becomes resistive and the entire input pulse is directed into the other path 16D. As a result, there is a change in the net flux threading loop 10D as the input or interrogation pulse supplied by source 64 is applied. This change in net flux is sensed by sense loop 40D and produces a voltage between output terminals 54D and 56D. During the latter portion of time interval T24, when the positive reset and readout signal is supplied by source 66 under control of switch 76, no resistance is introduced in the loop 10D and, therefore, there is no change in the net flux threading loop 10D and, thus, no voltage is induced in sense loop 40D and manifested between output terminals 54D and 56D.

The loop 10D remains in this condition with no current stored during time interval T25. During the next time interval T26, switch 72 is operated to apply a full select negative pulse having a maximum magnitude of twenty units at terminal 12D. This pulse has an effect similar to that of the positive pulse applied during time interval T22 with the exception that the persistent current stored in the loop by the application of the negative pulse is in a counterclockwise direction, that is, up in path 16D and down in path 18D. This counterclockwise persistent current remains stored in the loop during time interval T27. The loop is again interrogated during time interval T28 by successively operating switches 74 and 76. The first applied negative read out and reset pulse is in a direction to decrease the current in path 18D and increase the current in path 16D. Therefore, the current applied at terminal 12D may divide equally between the two paths without introducing resistance in loop 10D so that, upon termination of this pulse, the loop returns to its initial condition storing a counterclockwise persistent current of five units. Thus, during the application of this negative half select read out and reset pulse, there is no flux change within the loop 10D and, therefore, no voltage induced in sense loop 40D. However, when the positive read out and reset pulse is applied by operating switch 76, the direction of the current applied at terminal 12D is such as to tend to increase the current path 18D and decrease the current in path 16D. As a result, path 18D becomes resistive and the entire applied current is directed into path 16D and, as this is occurring, there is a change in the net flux threading storage loop 10D which induces a voltage in sense loop 40D that is manifested between terminals 54D and 56D. Upon termination of the positive read out an reset signal, storage loop 10D reverts to a condition in which there is no persistent current in the loop.

This condition is unchanged during time interval T29, but, during time interval T30, switch 70 is operated to apply a positive, or binary one, pulse at terminal 12D. As before, this pulse causes a clockwise persistent current of five units to be established in loop 10D. This condition persists during a time interval T31, at which time switch 72 is operated to apply a negative or binary zero storage pulse in the loop. As is shown by the waveforms illustrated for time interval T32, the application of the binary zero pulse is effective to cause a counterclockwise persistent current to be established in loop 10D even though there was a clockwise current stored in the loop when the binary zero pulse was applied.

The operation is similar when the loop is initially storing a counterclockwise persistent current as a result of a previous application of a binary zero pulse under the control of switch 72, and switch 70 is operated to apply a binary one pulse, this operation being effective to store a clockwise persistent current in loop 10D. It is, therefore, apparent that, regardless of the initial condition of the loop when switch 70 is operated to apply a full magnitude positive signal, which is termed a binary one signal, a persistent current of five units in a clockwise direction is stored in loop 10D. When switch 72 is operated to apply a full magnitude negative input pulse, which is termed a binary zero pulse, regardless of the initial condition of the loop, a counterclockwise persistent current of five units is stored. When switches 74 and 76 are operated to successively apply half magnitude negative and positive pulses at terminal 12D, which pulses are termed read out and reset pulses, the loop is always in the same condition with no persistent current stored at the end of this read out and reset operation.

When the circuit is initially storing a clockwise persistent current as a result of a previous application of a binary one pulse, a read out and reset operation is effective to produce between terminals 54D and 56D an output voltage only during the initial or first half of the time interval during which the read out operation is carried out. When the loop is storing a counterclockwise persistent current representative of a binary zero, a reset and read out operation produces a voltage between terminals 54D and 56D only during the latter portion of the read out operation, that is, when the positive half magnitude read out and reset pulse is applied. These output pulses developed at terminals 54D and 56D may be gated so that, for example, only pulses developed during the first portion of a read out and reset operation are utilized. In such a case, a voltage output developed during a read out operation would indicate that a binary one was stored in loop 10D, and the absence of a voltage would indicate that a binary zero was stored in the storage loop.

It should be further noted that the circuit of FIG. 10D may also be utilized as a circuit having three stable states; the first stable state, which is achieved by operating switch 70 regardless of the initial condition of the circuit, is that in which a clockwise persistent current is stored in loop 10; the second stable state, which is achieved by operating switch 72 regardless of the initial condition of loop 10, is that in which a counterclockwise persistent current is stored in loop 10D; and the third stable state, which is achieved by operating switches 74 and 76 successively regardless of the initial condition of the circuit, causes loop 10D to assume a condition in which there is no persistent current stored in the loop. The three states of the circuit may be interrogated by successively operating switches 74 and 76. When the circuit is in its first stable state storing a clockwise persistent current, an output voltage is developed between terminals 54D and 56D only during the first half of the interrogation time interval. When the circuit is in its second stable state and storing a persistent current in the counter-clockwise direction, an output voltage is developed between terminals 54D and 56D only during the latter portion of the interrogation time interval. Finally, when the circuit is in its third stable state with no persistent current stored in loop 10D, no output voltage is developed between terminals 54D and 56D during either portion of the interrogation time interval.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A persistent current storage device comprising first and second superconductive paths extending in parallel between first and second terminals to form a closed superconductive loop; the inductance of said first path being substantially equal to the inductance of said second path; said first path including at least a portion which is driven from a superconductive to a resistive state by its self-magnetic field when the current in said first path exceeds a predetermined current; said second path being capable of carrying a current appreciably greater than said predetermined current without any portion thereof being driven from a superconductive to a resistive state by its self-magnetic field; and current supply means connected to said first terminal for applying thereto a first current signal of sufficient magnitude to be effective as it is applied to cause said portion of said first path to be driven resistive so that upon its termination a persistent current substantially equal to said predetermined current is established in said loop; said current supply means thereafter applying a second current signal in a direction to add to the persistent current in said first path to thereby cause said first portion of said first path to be driven resistive; the magnitude of said second signal being equal to twice said predetermined current and effective upon its termination to reduce the current in said loop to essentially zero.

2. The device of claim 1 wherein each of said paths is fabricated entirely of the same superconductor material.

3. The device of claim 1 wherein at least said portion of said first path is fabricated of a first superconductor material and the remaining portions of said loop are fabricated of a different superconductor material.

4. A persistent current storage device comprising first and second conductor paths extending in parallel between first and second terminals to form a closed loop; each of said paths being fabricated of material which is superconductive at an operating temperature of the device in the absence of a magnetic field; the inductance of said first path being equal to the inductance of said second path; the Silsbee current for at least a portion of said first path at said operating temperature being appreciably less than the Silsbee current for any portion of said second path at said operating temperature and current supply means connected to said first terminal for first applying thereto a first current signal of sufficient magnitude to be effective upon its termination to cause a persistent current to be established in said loop and for thereafter applying a second current signal in a direction to add to the persistent current in said first path and having a magnitude such that it is effective upon its termination to reduce the current in said loop to essentially zero.

5. The device of claim 4 wherein at least a portion of said first path is fabricated of a first superconductor material and the remaining portions of said loop are fabricated of a different superconductor material.

6. The device of claim 4 wherein each of said paths is fabricated entirely of the same superconductor material.

7. The device of claim 6 wherein both of said paths are fabricated entirely of conductors having the same cross sectional geometry.

8. The device of claim 6 wherein the perimeter of a portion of said first superconductor path is less than the perimeter of any portion of said second superconductor path.

9. A persistent current storage device comprising first and second superconductive paths extending in parallel between first and second terminals to form a closed superconductive loop; pulse applying means connected to at least one of said terminals for applying thereat a first current pulse of a predetermined magnitude and polarity effective upon its termination to establish a persistent current in said loop and thereafter to apply a second pulse of a predetermined magnitude and polarity effective upon its termination to reduce the persistent current in said loop to essentially zero; and means for sensing when a persistent current is stored in said loop.

10. The device of claim 9 wherein the inductance of said first path is equal to the inductance of said second path.

11. The device of claim 10 wherein the polarity of said first pulse is opposite to the polarity of said second pulse and the magnitude of said first pulse is essentially twice the magnitude of said second pulse.

12. A persistent current storage device comprising first and second superconductive paths extending in parallel between first and second terminals to form a closed superconductive loop; the inductance of said first path being equal to the inductance of said second path; the Silsbee current for at least a portion of one of said paths being less than the Silsbee current for the remaining portions of said loop; means connected to at least one of said terminals and applying thereat first, second, and third different type current signals; said first current signals being effective to cause a persistent current in a first direction to be stored in said loop; said second current signals being effective to cause a persistent current in a second direction to be established in said loop; and said third current signals being effective to reduce said persistent currents in either direction to essentially zero.

References Cited in the file of this patent

UNITED STATES PATENTS

| | | |
|---|---|---|
| 2,832,897 | Buck | Apr. 29, 1958 |
| 2,877,448 | Nyberg | Mar. 10, 1959 |

OTHER REFERENCES

Some Experiments on a Supraconductive Alloy in a Magnetic Field, by J. M. Casimir-Jonkers et al., Physica, vol. 2, 1935, pp. 935–941.

Distribution of Magnetic Field Around Simply and Multiply Connected Supraconductors, by H. G. Smith et al., Proceedings of the Royal Society, London, vol. 157A, 1937, pp. 132–146.

The Persistatron: A Superconducting Memory and Switching Element for Computers, by M. J. Buckingham, Proceedings of 5th International Conference on Low Temperature Physics and Chemistry, Aug. 26–31, 1957. (Copy in Scientific Library.)

"A Review of Superconductive Switching Circuits" (Slade et al.), National Electronics Conference, vol. XIII, pp. 574–582, Oct. 7–9, 1957. (Copy in Div. 42.)

"Superconductivity" (Hewlett), General Electric Review, vol. 49, No. 6, pp. 19–25, June 1, 1946. (Copy in Div. 51.)

"A Computer Memory Element Employing Superconducting Persistent Currents" (Crittenden, Jr.), Aeronautical Research Lab. of Ramo-Wooldridge Corp. ARL–7–57, copy 293, Oct. 28, 1957, pp. 1–4. (Copy in Div. 42.)

"Cryogenic Devices in Logical Circuitry and Storage" (Bremer), Electrical Manufacturing, pp. 78–83, February 1958. (Copy in Div. 42.)